United States Patent [19]
Wood et al.

[11] Patent Number: 5,999,371
[45] Date of Patent: Dec. 7, 1999

[54] AERODYNAMIC LATCH WITH A VANE-PROPELLED SHAFT FOR A DISC DRIVE

[75] Inventors: Roy Lynn Wood, Yukon; Ryan Todd Ratliff, Oklahoma City; Nigel Frank Misso, Bethany, all of Okla.

[73] Assignee: Seagate Technology, Inc., Scotts Valley, Calif.

[21] Appl. No.: 09/016,766

[22] Filed: Jan. 30, 1998

Related U.S. Application Data

[60] Provisional application No. 60/057,139, Aug. 28, 1997, abandoned, and provisional application No. 60/062,859, Oct. 16, 1997, abandoned.

[51] Int. Cl.$^6$ ........................................................ G11B 5/54
[52] U.S. Cl. .............................................................. 360/105
[58] Field of Search .................................. 360/104, 105, 360/106

[56] References Cited

U.S. PATENT DOCUMENTS

| | | |
|---|---|---|
| 4,647,997 | 3/1987 | Westwood . |
| 5,043,834 | 8/1991 | Kubo et al. . |
| 5,187,627 | 2/1993 | Hickox et al. . |
| 5,224,000 | 6/1993 | Casey et al. . |
| 5,231,556 | 7/1993 | Blanks . |
| 5,274,519 | 12/1993 | Saito et al. .............................. 360/105 |
| 5,319,511 | 6/1994 | Lin ......................................... 360/105 |
| 5,404,636 | 4/1995 | Stefansky et al. . |

*Primary Examiner*—David D. Davis
*Attorney, Agent, or Firm*—Crowe & Dunlevy

[57] ABSTRACT

An actuator latch for latching an actuator of a disc drive having a rotating disc that induces airflow when the disc drive is operational, the actuator latch having a shaft supported by a baseplate, the shaft supporting a plurality of vanes to rotate the shaft in response to airflow generated by disc rotation. A locking member is operably engaged with the shaft and moveable thereby to a latched position and to an unlatched position, the actuator being secured by the locking member in the latched position and the actuator being released to move freely in the unlatched position. The locking member is caused to be positioned in the unlatched position when airflow rotates the vanes and shaft, and a biasing member reverse rotates the shaft when the airflow ceases, thus returning the locking member to the latched position when the disc drive becomes non-operational.

19 Claims, 3 Drawing Sheets

AERODYNAMIC LATCH WITH A VANE-PROPELLED SHAFT FOR A DISC DRIVE

RELATED APPLICATIONS

This application claims the benefit of U.S. Provisional Application Ser. No. 60/057,139 abandoned entitled AIR POWERED LATCH, filed Aug. 28, 1997, and U.S. Provisional Application Ser. No. 60/062,859 abandoned entitled LEAD SCREW LATCH, filed Oct. 16, 1997.

FIELD OF THE INVENTION

The present invention relates generally to the field of disc drive data storage devices, and more particularly but not by way of limitation, to an improved aerodynamic latch for an actuator of a disc drive.

BACKGROUND OF THE INVENTION

Modern disc drives are commonly used in a multitude of computer environments, ranging from super computers to notebook computers, to store large amounts of data in a form that is readily available to a user. Typically, a disc drive has one or more magnetic discs that are rotated by a spindle motor at a constant high speed. Each disc has a data storage surface divided into a series of generally concentric data tracks that are radially spaced across a band having an inner diameter and an outer diameter. The data is stored within the data tracks on the disc surfaces in the form of magnetic flux transitions. The flux transitions are induced by an array of read/write heads. Typically, each data track is divided into a number of data sectors where data is stored in fixed size data blocks.

The read/write head includes an interactive element such as a magnetic transducer. The interactive element senses the magnetic transitions on a selected data track to read the data stored on the track. Alternatively, the interactive element transmits an electrical signal that induces magnetic transitions on the selected data track to write data to the track.

Each of the read/write heads is mounted to a rotary actuator arm and is selectively positioned by the actuator arm over a pre-selected data track of the disc to either read data from or write data to the data track. The read/write head includes a slider assembly having an air bearing surface that, in response to air currents caused by rotation of the disc, causes the head to fly adjacent to the disc surface with a desired gap separating the read/write head and the corresponding disc.

Typically, multiple center-open discs and spacer rings are of the discs. Typically, a landing zone is provided on each of the disc surfaces where the read/write heads are positioned before the rotational velocity of the spinning discs decreases below a threshold velocity which sustains the air bearing. The landing zones are generally located near the inner diameter of the discs.

Once the heads are positioned in the landing zones, it is necessary to secure the actuator assembly by a latching arrangement to prevent the heads from subsequently moving out onto the data surfaces of the discs while the disc drive is not in use. Latching arrangements are well known in the art and have included various configurations of springs, solenoids and magnets to secure and release the actuator. For example, see U.S. Pat. No. 5,187,627 entitled MAGNETIC LATCH AND CRASH STOP, issued Feb. 16, 1993, to Hickox and Stram; U.S. Pat. No. 5,224,000 entitled CRASH STOP AND MAGNETIC LATCH FOR A VOICE COIL ACTUATOR, issued Jun. 29, 1993, to Casey and West; and U.S. Pat. No. 5,231,556 entitled SELF-HOLDING LATCH ASSEMBLY, issued Jul. 27, 1993, to Blanks. All of these references are assigned to the assignee of the present invention.

In addition to the latch mechanisms mentioned above, there have been efforts to couple the operation of a latching device with the airflow generated by the rotation of the discs. That is, it is known to use the energy of the air currents generated by the rotation of a plurality of stacked discs to release a passive, spring-loaded aerodynamically responsive latch. For example, such latches are taught in U.S. Pat. No. 4,647,997 entitled AERODYNAMIC LATCH FOR DISK FILE ACTUATOR, issued Mar. 3, 1987, to Westwood; and U.S. Pat. No. 5,043,834 entitled ACTUATOR LOCKING SYSTEM OF DISK UNIT, issued Aug. 27, 1991, to Kubo, Masuda and Nakagawa.

Associated problems with such devices have limited the application in which they can be used. For example, a continuing trend in the industry is the reduction in size of modern disc drives. As a result, the discs of modern disc drives increasingly have smaller diameters and tighter spacings. Although providing increasing amounts of storage capacity, narrow vertical spacing of the discs gives rise to a problem of increased sensitivity to external mechanical shock. Additionally, as disc drives continue to decrease in size, smaller heads, thinner substrates, longer and thinner actuator arms and thinner gimbal assemblies continue to be incorporated into the disc drives. These factors significantly increase the need to protect the disc drives from incidental contact between the actuator arm/gimbal assemblies and the gages the actuator so that the actuator can freely move. A common problem, however, is associated with the fact that only a relatively small force is necessary to release the lever, typically less than 2 gram-meters. Movement of the lever is easily triggered by non-operating torques because forces greater than this magnitude and more are very common in normal shipping and handling activities. Such non-operating forces often result in the disengagement of the lever from the actuator while the disc drive is not operating. Since the discs are not spinning there is no air bearing, so a free moving actuator can cause the read/write heads to contact the data storage tracks, likely causing damage to the data storage surfaces.

Accordingly, there is a need for an improved aerodynamically driven latch apparatus for a disc drive to reduce the susceptibility of damage to the disc drive as a result of non-operating mechanical shocks.

SUMMARY OF THE INVENTION

The present invention provides a latch apparatus for latching the actuator of a disc drive during the time that the disc drive is in a non-operational state.

In a preferred embodiment, a disc drive assembly has a basedeck on which is supported a spindle motor assembly that supports and rotates a plurality of discs about a common central axis, each of the discs having a data recording surface and a parking surface. An actuator assembly is supported by the basedeck and has a plurality of actuator arms controllably rotatable over, and radially extending adjacent to, the data recording and parking surfaces of the discs. The actuator arms support read/write heads adjacent the data recording surfaces for reading data from and writing data to the recording surfaces.

In an operating mode of the disc drive, the spindle motor rotates the discs which, in turn, induce an airflow in the disc drive. An actuator latch is provided which has a shaft assembly supported by the baseplate, the shaft assembly having a shaft which has a plurality of vanes supported thereby, the vanes being positioned in the airflow. The shaft is thereby rotated by airflow of the spinning discs engaging the vanes. A locking member operably engages the shaft assembly and is moveable thereby to a latched position and to an unlatched position. In the latched position, the actuator is secured by the locking member so that the read/write head remains at the parked surface, and in the unlatched position, the actuator is released so that the read/write head is free to move over the data recording surface. A biasing member couples the shaft and the basedeck to resist the force of the airflow and to return the shaft to an un-rotated position when the disc drive is non-operational.

The advantages and features of the present invention will be apparent from the following description when read in conjunction with the drawings and appended claims.

DETAILED DESCRIPTION

Figure 1:
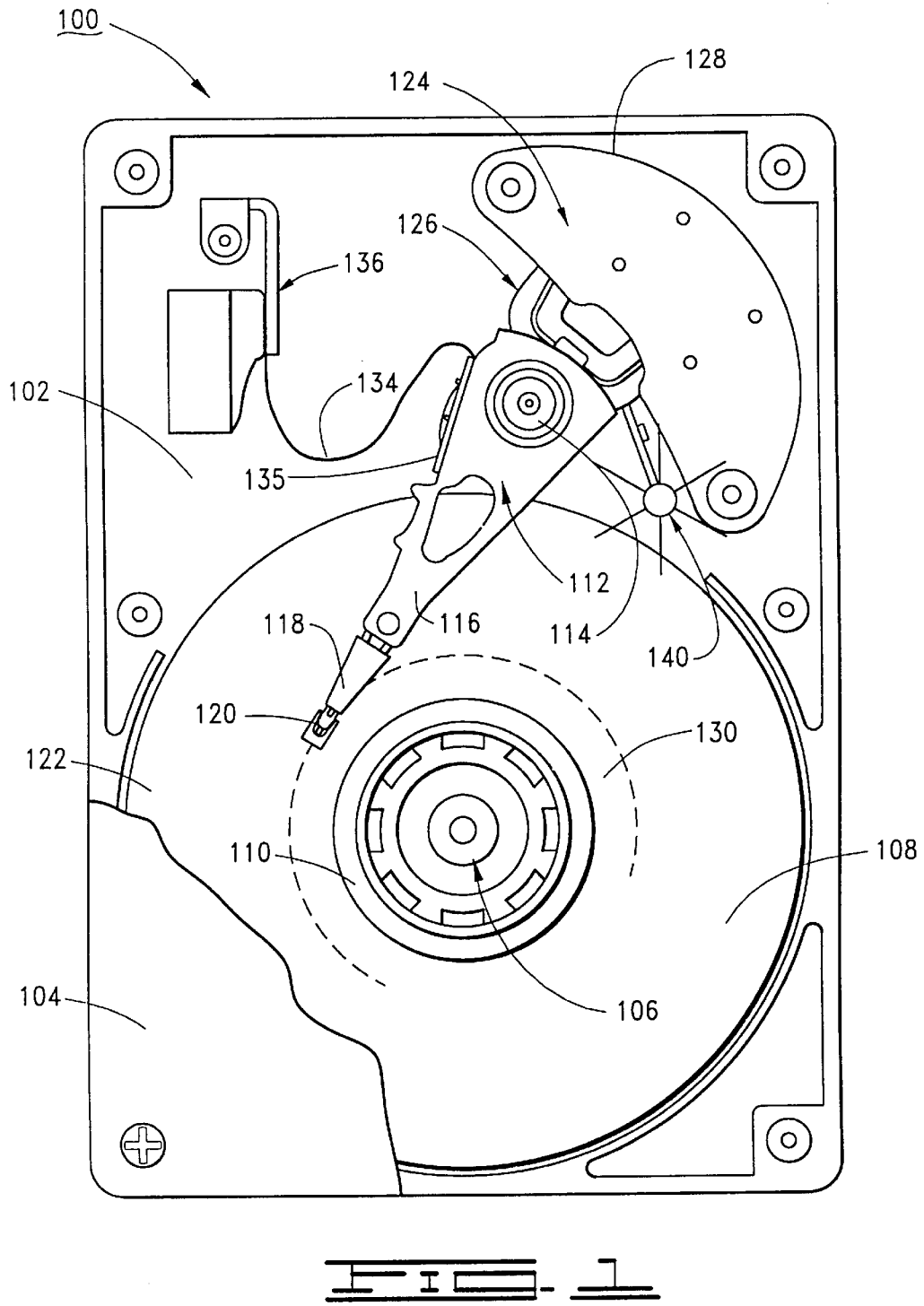
FIG. 1 is a top plan view of a disc drive constructed in accordance with a preferred embodiment of the present invention and showing the actuator latch in the latched position.
Figure 2:
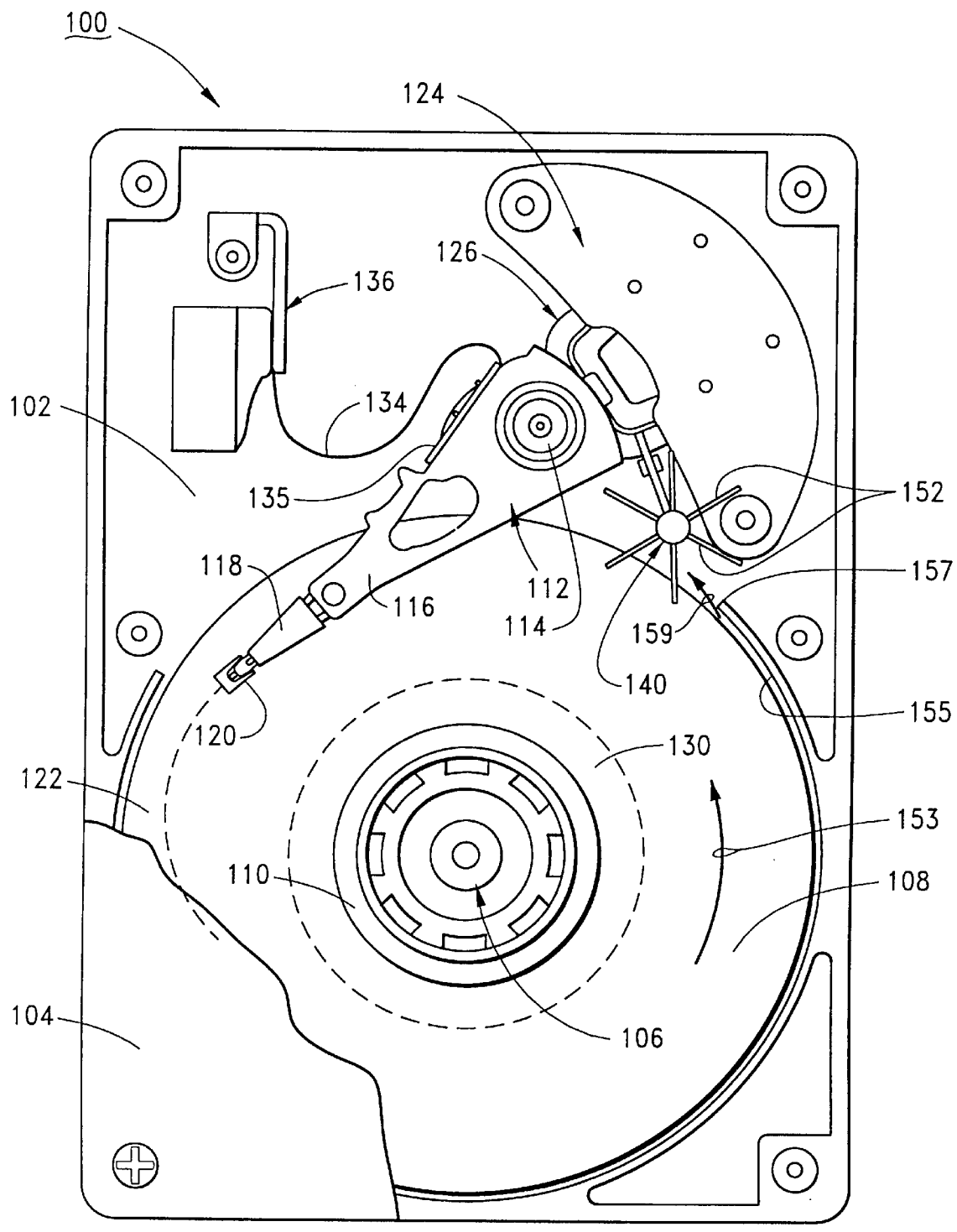
FIG. 2 is a top plan view of the disc drive of FIG. 1 showing the actuator latch in the unlatched position.

Referring to the drawings in general, and more particularly to FIGS. 1 and 2, shown therein are top plan views of a disc drive 100 constructed in accordance with a preferred embodiment of the present invention. The disc drive 100 includes a basedeck 102 to which various disc drive components are mounted, and a top cover 104, which together with the basedeck 102 provides a sealed internal environment for the disc drive 100. The top cover 104 is shown in a partial cut-away fashion to expose selected components of interest. It will be understood that numerous details of construction of the disc drive 100 are not included in the following description, as such, they are well known to those skilled in the art and are believed to be unnecessary for the purpose of describing the present invention.

Mounted to the basedeck 102 is a spindle motor 106 to which a plurality of discs 108 are mounted and secured by a clamp ring 110 for rotation at a constant high speed. Adjacent the discs 108 is an actuator assembly 112 (sometimes also referred to as an "E-block") which pivots about a pivot shaft bearing assembly 114 in a rotary fashion. The actuator assembly 112 includes actuator arms 116 (only one shown) that support load arm assemblies 118. The load arm assemblies 118 in turn support read/write heads 120, with each of the heads 120 adjacent a surface of one of the discs 108. As mentioned hereinabove, each of the discs 108 has a data recording surface 122 divided into concentric circular data tracks (not shown), and the heads 120 are positionably located adjacent data tracks to read data from, or write data to, the tracks.

The actuator assembly 112 is controllably positioned by way of a voice coil motor assembly (VCM) 124, comprising an actuator coil 126 immersed in the magnetic field generated by a permanent magnet (not shown). A magnetically permeable flux path, such as a steel plate 128, is mounted above the actuator coil 126 to complete the magnetic circuit of the VCM 124. When controlled current is passed through the actuator coil 126, an electromagnetic field is set up which interacts with the magnetic circuit of the VCM 124 to cause the actuator coil 126 to move relative to the permanent magnet in accordance with the well-known Lorentz relationship. As the actuator coil 126 moves, the actuator assembly 112 pivots about the pivot shaft bearing assembly 114, causing the actuator arms 116 to move the heads 120 adjacent to, and across, the discs 108. Located near the inner clamp ring 110 are parking surfaces 130, the parking surfaces 130 being non-data surfaces that are designated areas where the heads 120 come to rest when the disc drive becomes non-operational, the provision of the parking surfaces 130 preventing the heads 120 from damaging any data storage locations.

To provide the requisite electrical conduction paths between the heads 120 and disc drive read/write circuitry (not shown), head wires (not separately shown) are routed on the actuator assembly 112 from the heads 120, along the load arm assemblies 118 and the actuator arms 116, to a flex circuit 134. The head wires are secured by way of a suitable soldering process to corresponding pads of a printed circuit board (PCB) 135 of the flex circuit 134. In turn, the flex circuit assembly 134 is connected to a flex circuit bracket 136 in a conventional manner, which in turn is connected through the basedeck 102 to a disc drive PCB (not shown) mounted to the underside of the basedeck 102. The disc drive PCB provides the disc drive read/write circuitry which controls the operation of the heads 120, as well as other interface and control circuitry for the disc drive 100.

Figure 3:
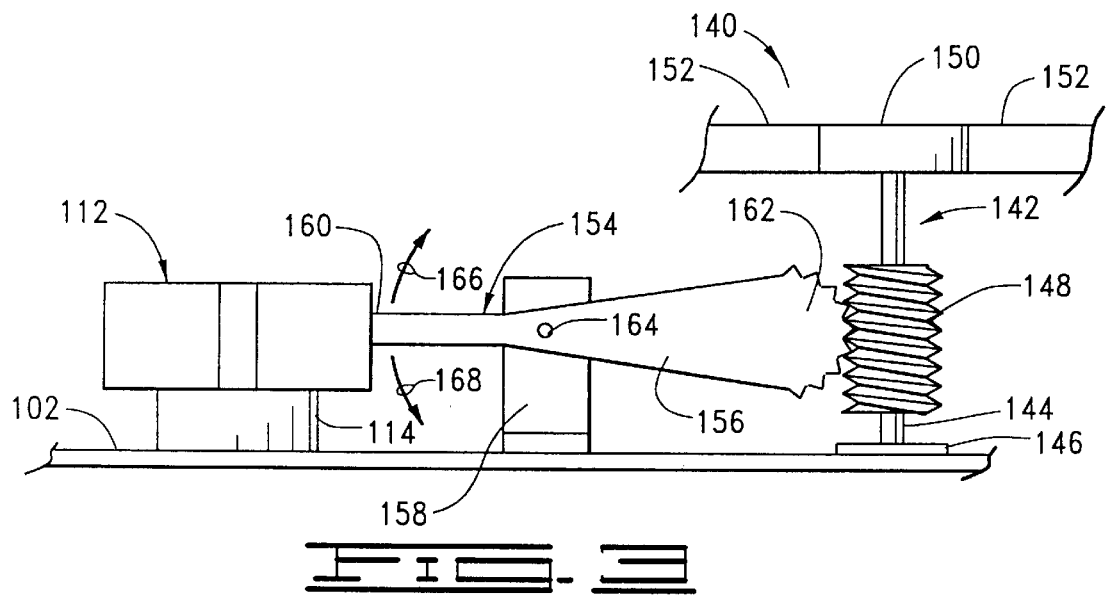
FIG. 3 is a semi-detailed, diagrammatical side elevational representation of the actuator latch of FIG. 1.

Shown in FIGS. 1 and 2 is an actuator latch assembly 140 which serves to latch the actuator assembly 112 in either a latched position, as depicted in FIG. 1, or an unlatched position, as depicted in FIG. 2. FIG. 3 shows a semi-detailed, diagrammatical depiction of the actuator latch 140 in elevation. The actuator latch assembly 140 has a shaft assembly 142 which has a shaft 144 pivotally supported by the basedeck 102 by a suitable bearing arrangement for rotation. A coil spring 146 is attached at one end to the shaft 144 and at the other end to the basedeck 102 to bias the shaft 144 to a non-rotated position associated with substantially no winding of the coil spring 146. Mounted on a medial portion of the shaft 144 is a driving gear 148. Alternatively, the shaft 144 can form a screw thread. Secured to the upper end of the shaft 144 is a hub 150 having a plurality of vanes 152 extending therefrom. The purpose of the vanes 152, as will become clear, is to cause the shaft 144 to rotate when impinged by the air currents generated by the rotation of the discs 108.

Referring to FIG. 2, it will be noted that the discs 108 spin in a direction shown by directional arrow 153 and create an airflow in the disc drive 100. The airflow is constrained within the areas between the discs by a shroud 155 which can be formed as a portion of the basedeck 102. The shroud has a trailing end 157 which forms a clearance opening for rotation of the actuator assembly 112 in order to radially position the read/write heads 120 adjacent selected surfaces of the discs 108.

The trailing end 157 of the shroud 155 furthermore provides a controlled release of the airflow from the areas between the discs 108 in a direction shown by arrow 159. The airflow in direction 159 impinges on the plurality of vanes 152 to rotate the shaft 144 in a clockwise direction as viewed from the perspective of FIG. 2.

Returning now to FIG. 3, the actuator latch assembly 140 also has a locking member 154 which has a sector plate 156 mounted to a locking base 158 which is attached (such as by the use of screws and threaded apertures) to the basedeck 102 in proximity to the shaft assembly 142. The sector plate 156 has a locking end 160 and an opposing driven gear end 162 which has gear teeth as shown. A pivot member 164 connects the sector plate 156 to the locking base 158 so that the sector plate 156 can pivot relative thereto such that the locking end 160 can be rotated in a first rotational direction 166 and in a second rotational direction 168, as depicted by the designated arrows.

As shown in FIG. 3, the locking member 154 is depicted in the latched position wherein the locking end of the sector plate 156 is abutted against the actuator assembly 112. If desired, a notch or other stop can be formed in an appropriate location, and the locking end 160 can be caused to abut against the notch so that movement of the actuator 112 is prevented in either rotational direction. As the shaft 144 is turned by the impingement of the airflow from the rotation of the discs 108, the driving gear 148 threadingly advances the driven gear end 162 which pivots the sector plate 156 to raise the locked end 160 into the unlatched position, wherein the locked end 160 will be raised above the actuator assembly 112 to thereby release the actuator assembly 112 to be moveable across the data recording surfaces 122. Preferably, the gear pitch of the driving gear 148 and the driven gear end 162 is such that more than one complete revolution of the shaft 144 is necessary to raise the locked end 160 to the unlatched position, so that incidental forces are not likely to effect the unlatching of the actuator assembly 112 when the disc drive 100 is not operational.

Figure 4:
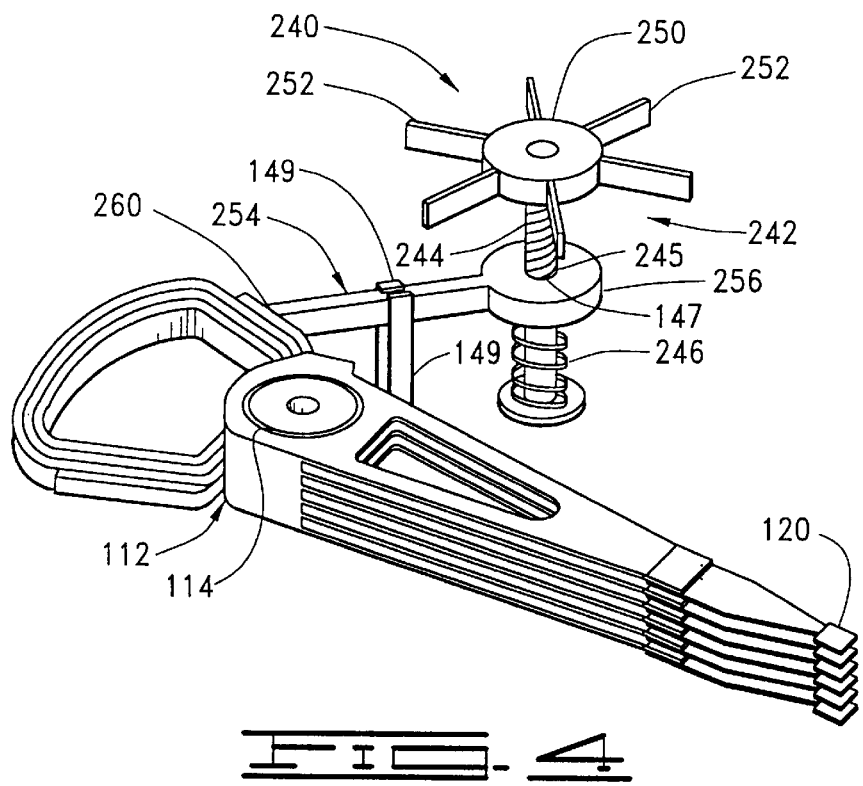
FIG. 4 is a semi-detailed, diagrammatical perspective view of an actuator latch constructed in accordance with an alternative preferred embodiment of the present invention.

Turning finally to FIG. 4, shown therein is an alternative construction of the actuator latch of the present invention. It will be noted that shown therein is the actuator assembly 112 which pivots about the pivot shaft bearing assembly 114 to position the read/write head 120 to desired data recording surfaces 122 or alternatively to parking surfaces 130 as described hereinabove.

A shaft assembly 240 serves to latch the actuator assembly 112 in either a latched position, as depicted in FIG. 4, or an unlatched position. The actuator latch assembly 240 has a shaft assembly 242 which has a shaft 244 pivotally supported by the basedeck 102 by a suitable bearing arrangement for rotation thereon. Secured to the upper end of the shaft 244 is a hub 250 having a plurality of vanes 252 extending therefrom. The vanes 252 cause the shaft 244 to rotate when impinged by the airflow generated by rotation of the discs 108, in the same manner as described hereinabove.

The shaft 244 forms an external screw thread 145. Alternatively, a driving gear can be attached to the shaft 244. A locking member 254 has a sector plate 256 with a locking end 260 that abuttingly engages the actuator assembly 112 in the latched position to prevent rotation thereof. The sector plate 256 has a threaded aperture 147 which threadingly engages the screw thread 145 of the shaft 244 so that rotational displacement of the shaft 244 imparts linear displacement to the sector plate 256.

An opposing pair of guide posts 149 flank an intermediate portion of the sector plate 256 to prevent rotation thereof, and to permit a supporting sliding engagement therebetween to facilitate a threading advancement of the sector plate 256 in response to rotation of the shaft 244. A coil spring 246 is disposed between the sector plate 256 and the basedeck 102. As the air current of spinning discs 108 impact the vanes 252 and thus impart a clockwise rotation to the shaft 244 (as viewed from the perspective of FIG. 4), the sector plate 256 threadingly advances downward. The pitch of the thread 145 and the threaded aperture 147 is selected such that more than one complete revolution of the shaft 244 is required in order to advance the sector plate 256 sufficiently so as to pressingly disengage it from the actuator assembly 112, or in other words, so as to move the actuator latch assembly 240 to the unlatched position. It will be noted that the coil spring 246 is in compression when the actuator latch assembly 240 is in the unlatched position.

After a disc drive 100 operating cycle is complete and the spindle motor 106 ceases to spin the discs 108, the air flow diminishes as the discs 108 decelerate, as described hereinabove. As the air flow diminishes, the corresponding force of the airflow on the vanes 252 likewise diminishes. Eventually, the compression of the spring 246 acting upward on the sector plate 256 will produce a reverse-rotation force on the shaft 244 that is greater than the airflow force. At that point the coil spring 246 will begin unwinding the shaft 244 and threadingly advancing the sector plate 256 upward to the latched position.

The upward and downward limits of sector plate 256 travel are controlled by the full compression and decompression of the spring 246. Alternatively, positive stops can be used to abuttingly engage the sector plate 256 at the limits of travel. Such positive stops could by attached to the guide posts 149 or the shaft 244. Still another embodiment would limit the travel by a shortened thread 145 which would extend only as far as the desired sector plate 256 travel.

Thus, the present invention provides an actuator latch assembly (such as 140, 240) for a disc drive (100) having a rotatable disc (108). The actuator latch assembly has a rotatable shaft (such as 144, 244) which support a plurality of vanes (such as 152, 252) that are disposed in the airflow established by the rotation of the disc during operation of the disc drive. The air flow impinges against the vanes and imparts a rotation to the shaft.

The latch assembly furthermore has a locking member (such as 154, 254) that is operably coupled to the shaft to unlatch the actuator assembly in response to the rotation of the shaft over more than one complete revolution of the shaft. A biasing member (such as 146, 246) is operably coupled to the shaft to move the locking member to a latched position in response to non-rotation of the disc.

It is to be understood that even though numerous characteristics and advantages of various embodiments of the present invention have been set forth in the foregoing description, together with details of the structure and function of various embodiments of the invention, this disclosure is illustrative only, and changes may be made in details especially in matters of structure and arrangement of parts within the principles of the present invention to the full extent indicated by the broad general meaning of the terms in which the appended claims are expressed. For example, the particular elements may vary depending on the particular application for the aerodynamic latch for a disc drive while maintaining substantially the same functionality without departing from the scope and spirit of the present invention.

What is claimed is:

1. An apparatus for latching an actuator assembly of a disc drive having a rotatable disc, the latching apparatus providing a fixed position of the actuator assembly when the disc drive is non-operational, latching apparatus comprising:
    a rotatable shaft adjacent the disc and having a non-rotated position;
    a plurality of vanes supported by the shaft which are impinged by an air current provided by rotation of the discs and inducing, in turn, rotational movement to rotate the shaft to a rotated position, the rotated position being angularly displaced at least one complete revolution of the shaft from the non-rotated position; and
    a locking member, operably coupled to the shaft, to latch the actuator assembly in the non-rotated position of the shaft and to unlatch the actuator assembly in the rotated position of the shaft.

2. The apparatus of claim 1, further comprising:
    a biasing member, operably coupled to the shaft, which rotates the locking member to a latched position in response to non-rotation of the disc.

3. The apparatus of claim 1, wherein the shaft is provided with a plurality threads, and wherein the locking member comprises a pivotal sector plate having a locking end and a gear end, wherein the gear end engages the plurality of threads of the shaft so that rotation of the shaft causes pivotal movement of the locking end to a position sufficient to latch the actuator assembly.

4. The apparatus of claim 1, wherein the shaft is provided with a plurality of threads, and wherein the locking member comprises a sector plate having a threaded opening and a locking arm, wherein the threaded opening threadingly engages the plurality of threads of the shaft to move the locking arm to a position sufficient to latch the actuator assembly.

5. An actuator latch for latching an actuator of a disc drive when the disc drive is non-operational, the disc drive having a baseplate and a rotating disc that induces an airflow when the disc drive is operational, the actuator latch comprising:
    a shaft assembly supported by the baseplate, the shaft assembly comprising:
        a shaft rotatable in a first rotatable direction and in a second rotatable direction; and
        a plurality of vanes supported by the shaft to rotate the shaft in the first rotatable direction in response to airflow;
    a locking member operably engaging the shaft assembly and moveable thereby to a latched position and to an unlatched position, the actuator being secured by the locking member in a fixed position in the latched position, the actuator being released to allow movement thereof in the unlatched position, the locking member movable from the latched position to the unlatched position when the shaft is rotated more than one complete revolution in the first rotatable direction; and
    a biasing member coupled between the baseplate and the shaft to rotate the shaft in the second rotatable direction when the airflow ceases as the disc drive becomes non-operational.

6. The actuator latch of claim 5 wherein the locking member comprises:
    a locking base supported by the baseplate;
    a sector plate; and
    a pivot member connecting the sector plate to the locking base so that the sector plate pivots between the latched position and the unlatched position.

7. The actuator latch of claim 6 wherein the shaft assembly further comprises a driving gear supported by the shaft, and wherein the sector plate has a locking end and an opposing driven gear end, the locking end engageable with the actuator in the latched position, the driven gear end drivingly engaged by the driving gear, and wherein rotation of the shaft rotates the sector member about the pivot member.

8. The actuator latch of claim 7 wherein the driving gear and the driven gear end are determined so that more than one complete rotation of the shaft is necessary to move the sector plate from the unlatched position to the latched position.

9. The actuator latch of claim 8 wherein the bias member is a coiled spring.

10. The actuator latch of claim 5 wherein the locking member comprises:
    a sector plate having a proximate end supported by the shaft and a distal end responsive to the proximate end in moving in a first direction and alternatively moving in a second direction; and
    a guide member supported by the baseplate wherein the sector plate operably engages the guide member as the locking member moves between the latched and the unlatched positions.

11. The actuator latch of claim 10 wherein the shaft further comprises a threaded portion, and wherein the sector plate has a threaded opening which threadingly engages the threaded portion to threadingly advance the sector plate in response to rotation of the shaft to move the sector plate between the latched position and the unlatched position, and wherein the sector plate distal end engages the actuator in the latched position and the sector plate distal end disengages the actuator in the unlatched position.

12. The actuator latch of claim 11 wherein the shaft threaded portion and the threaded opening of the sector plate have a selected thread pitch so that more than one complete revolution of the shaft is necessary to move the sector plate from the unlatched position to the latched position.

13. The actuator latch of claim 12 wherein the bias member is a coiled spring.

14. A disc drive, comprising:
    a baseplate;

a spindle motor assembly supported by the baseplate;

a disc supported by the spindle motor assembly for rotation when the disc drive is operational, the rotating disc inducing an airflow within the housing, the disc having a data recording surface and a landing surface;

an actuator assembly pivotally supported by the baseplate;

a head supported by the actuator and moveable by the actuator adjacent to the data recording surface and the landing surface; and an actuator latch assembly to latch the actuator in a fixed position when the disc drive is non-operational, the actuator latch assembly comprising:

a shaft assembly supported by the baseplate, comprising:

a shaft having a non-rotated position and rotatable in a first angular direction and in a second angular direction; and a plurality of vanes supported by the shaft to rotate the shaft in the first rotatable direction in response to airflow from rotation of the disc when the disc drive is operational;

a locking member operably engaging the shaft and moveable between a latched position at the non-rotated position of the shaft and an unlatched position at a rotated position of the shaft, the rotated position being angularly displaced at least one complete revolution of the shaft in the first direction from the non-rotated position; and a biasing member coupling the shaft and baseplate to rotate the shaft in the second angular direction when the airflow ceases because the disc drive is non-operational.

15. The disc drive of claim 14 wherein the locking member comprises:

a locking base supported by the baseplate;

a sector plate; and a pivot member connecting the sector plate to the locking base to pivot the sector plate between the latched position and the unlatched position.

16. The disc drive of claim 15 wherein the shaft assembly further comprises a driving gear supported by the shaft, and wherein the sector plate has a locking end and an opposing driven gear end, the locking end engageable with the actuator in the latched position, the driven gear end drivingly engaged by the driving gear, and wherein rotation of the shaft rotates the sector member about the pivot member.

17. The disc drive of claim 16 wherein the driving gear and the driven gear end are so that more than one complete rotation of the shaft is necessary to move the sector plate from the unlatched position to the latched position.

18. The disc drive latch of claim 17 wherein the bias member is a coiled spring.

19. A method for latching an actuator of a disc drive assembly in a fixed position when the disc drive is not operational, and for unlatching the actuator when the disc drive is operational, the method comprising steps of:

(a) rotating a disc of the disc drive assembly when the disc drive is operational, the rotating disc inducing an airflow within the disc drive assembly;

(b) rotating a shaft more than one revolution by providing a plurality of vanes attached to the shaft which rotate in response to the airflow;

(c) coupling a sector plate to the shaft so that rotation of the shaft moves the sector plate between a latched and an unlatched position, wherein the latched position prevents movement of the actuator, and wherein the unlatched position permits free movement of the actuator; and (d) biasing the shaft to a position that places the sector plate in the latched position when the disc drive is not operational.

* * * * *